United States Patent
Chou et al.

(10) Patent No.: US 7,216,243 B2
(45) Date of Patent: May 8, 2007

(54) SYSTEM AND METHOD FOR SELECTING A POWER MODE FOR A DEVICE BASED ON THE DEVICES OPERATING STATE AT EACH OF A PLURALITY OF SAMPLING TIME UNITS

(75) Inventors: Liang Kuang Chou, Hsinchu (TW); Ling Chiu, Hsinchu (TW)

(73) Assignee: Wistron Neweb Corporation, Taipei Hsien (TW)

( * ) Notice: Subject to any disclaimer, the term of this patent is extended or adjusted under 35 U.S.C. 154(b) by 375 days.

(21) Appl. No.: 10/802,752

(22) Filed: Mar. 18, 2004

(65) Prior Publication Data

US 2004/0205365 A1 Oct. 14, 2004

(30) Foreign Application Priority Data

Apr. 9, 2003 (TW) .............................. 92108131 A

(51) Int. Cl.
G06F 1/26 (2006.01)
G06F 1/32 (2006.01)
(52) U.S. Cl. .................. 713/320; 713/300; 713/323
(58) Field of Classification Search ................ 713/300, 713/320, 322
See application file for complete search history.

(56) References Cited

U.S. PATENT DOCUMENTS

| | | | |
|---|---|---|---|
| 6,076,171 A * | 6/2000 | Kawata ...................... 713/501 |
| 6,236,674 B1 | 5/2001 | Morelli et al. |
| 6,330,462 B1 | 12/2001 | Chen |
| 6,470,456 B1 * | 10/2002 | Chung-Chih ................. 713/322 |
| 6,489,725 B1 | 12/2002 | Suzuki et al. |
| 7,050,940 B2 * | 5/2006 | Basso et al. ................. 702/184 |
| 2004/0123169 A1 * | 6/2004 | Elnozahy et al. ........... 713/320 |
| 2005/0246564 A1 * | 11/2005 | Bhesania et al. ........... 713/320 |

* cited by examiner

*Primary Examiner*—Chun Cao
*Assistant Examiner*—Mark Connolly
(74) *Attorney, Agent, or Firm*—Birch, Stewart, Kolasch & Birch, LLP

(57) ABSTRACT

A method and an apparatus for power management of an electronic device are provided. The electronic device can be operated under at least a first operation state and a second operation state. The electronic device has a first power mode and a second power mode. The method includes the following steps. A sampling time span that includes a plurality of sampling time units is set up. The operation state of the electronic device at each the sampling time unit is determined. A first ratio of the sampling time units in which the electronic device is operated under the first operation state is calculated. The electronic device is operated according to the first ratio. The electronic device is switched to the first power mode when the first ratio is larger than a predetermined value. The electronic device is switched to the second power mode when the first ratio is smaller than the predetermined value.

8 Claims, 5 Drawing Sheets

SYSTEM AND METHOD FOR SELECTING A POWER MODE FOR A DEVICE BASED ON THE DEVICES OPERATING STATE AT EACH OF A PLURALITY OF SAMPLING TIME UNITS

CROSS REFERENCE TO RELATED APPLICATIONS

This application claims priority of Taiwan Patent Application Serial No. 092108131 filed on Apr. 9, 2003.

FIELD OF THE INVENTION

The present invention relates to a method and an apparatus for power management of an electronic device.

BACKGROUND OF THE INVENTION

Mobile electronic devices for accessing wireless network is becoming more and more popular, but the power consumption of devices with built-in wireless network function is high, and thus shortens the operation time of mobile electronic devices using batteries for power supply. Several methods for power management of an electronic device are provided in U.S. Pat. No. 6,330,462 B1, U.S. Pat. No. 6,236,674 B1, U.S. Pat. No. 6,489,725 B1, etc. A communication system disclosed in U.S. Pat. No. 6,330,462 B1 manages power by changing a rate of transmitting data. The system includes a transmitter and a receiver. Firstly, the transmitter is operated at an idle rate. Next, the transmitter sends a notice to the receiver when the transmitter receives the data to be transmitted at a high rate. Finally, the transmitter transmits the data to the receiver at a high rate. The method described in U.S. Pat. No. 6,236,674 B1 manages power by mode switching. The transmitter and the receiver can switch between a low-consumption mode and an active mode, and a control circuit controls the switch according to the data detected to be received. The receiver of the method also can include a circuit detecting the strength of the signal to be received. The circuit can disable the receiver circuit when the detected strength of the data to be received is smaller than a predetermined value. The method of U.S. Pat. No. 6,489,725 B1 uses a power saving circuit to save standby power of electronic devices. A capacitor is connected to an AC power supply, and a phase-leading current component passing the capacitor is used to make a DC power supply supplying power during standby. In case an infrared command is used, the capacitor is connected in parallel to another capacitor to strengthen the current output capability of the DC power supply, having an AC switching element maintained in on mode.

However, power consumption for the abovementioned designs is high, and a method and an apparatus for power management to save more power is needed.

SUMMARY OF THE INVENTION

Therefore, one purpose of the present invention is to provide a method and an apparatus for power management of an electronic device. The method and the apparatus can monitor the state of data transfer of the electric device and control the electric power according to the user's setting to save power.

The spirit of the present invention lies in its deciding the power mode according to the monitored state of data transfer of the electronic device so as to save power.

A method and an apparatus for power management of an electronic device are provided. The electronic device has a first power mode and a second power mode, and may be in a first operation state or a second operation state.

First Method for Power Management

The method for the present invention includes the following steps. A sampling time span including a plurality of sampling time units is set. The operation state of the electronic device during each sampling time unit is decided. The ratio of sampling time units, in which the electronic device is at the first operation state, in the sampling time span is calculated. The power mode of the electronic device is determined according to the ratio. When the ratio is larger than a predetermined value, the electronic device is switched to the first power mode. When the ratio is smaller than the predetermined value, the electronic device is switched to the second power mode.

The above-mentioned steps of determining operation state of each sampling time unit further include the following steps. An accumulated quantity of transferred data is calculated at the beginning of one sampling time unit. A temporary accumulated quantity of transferred data is calculated at the end of the sampling time unit. The temporary accumulated quantity of transferred data is compared with the accumulated quantity of transferred data. When the temporary accumulated quantity of transferred data equals the accumulated quantity of transferred data, the operation state for this sampling time unit is categorized to be at a first operation state.

The first power mode can be an off mode and the second power mode can be an on mode, and the electronic device can be set in the second power mode at the beginning. The first operation state can be an idle state and the second operation state can be an active state, but is not limited thereto. A user can decide the sampling time. The user can also determine the length of each sampling time unit. When the first operation state is an idle state and the first power mode is an off mode, the above-mentioned predetermined value can be set to be between 0.8 and 1, but is not limited thereto.

Second Method for Power Management

The method according to another aspect of the present invention includes the following steps. A sampling time span including a plurality of sampling time units is set. The operation state of the electronic device during each sampling time unit is decided. The number of sampling time units during which the device is in the first operation state in this sampling time span is calculated. The power mode of the electronic device is determined according to the number. When the number is larger than a predetermined number, the electronic device is switched to the first power mode. When the number is smaller than the predetermined number, the electronic device is switched to the second power mode.

The above-mentioned steps of determining operation state of each sampling time unit further includes the following steps. An accumulated quantity of transferred data is calculated at the beginning of one sampling time unit. A temporary accumulated quantity of transferred data is calculated at the end of the sampling time unit. The temporary accumulated quantity of transferred data is compared with the accumulated quantity of transferred data. When the temporary accumulated quantity of transferred data equals the accumulated quantity of transferred data, the operation state for this sampling time unit is categorized to be at a first operation state.

The first power mode can be an off mode and the second power mode can be an on mode, and so the electronic device can be set in the second power mode at the beginning. The first operation state can be an idle state and the second operation state can be an active state, but is not limited thereto. The sampling time span can also be determined by the user, such as for 10 minutes, but it is not limited thereto. The length of each sampling time unit can also be determined by the user, such as 5 seconds, but is not limited thereto.

First Power Management Device

A power management device of the present invention includes a setup unit, a state determination unit, a calculation unit, and a decision unit. The setup unit sets up a sampling time span including a plurality of sampling time units. The state determination unit determines the operation state of the electronic device at each sampling time unit according to the operation of the electronic device at each sampling time unit. The ratio of sampling time units, in which the electronic device is at the first operation state, in the sampling time span is calculated by the calculation unit. A decision unit operates the electronic device in either the first or the second power mode according to the ratio. When the ratio is larger than a predetermined value, the electronic device is switched to the first power mode. When the ratio is smaller than the predetermined value, the electronic device is switched to the second power mode.

The above-mentioned state determination unit further has a first calculation unit, a second calculation unit, and a check unit. The first calculation unit calculates an accumulated quantity of transferred data at the beginning of one sampling time unit. The second calculation unit calculates a temporary accumulated quantity of transferred data at the end of the sampling time unit. The check unit checks whether the temporary accumulated quantity of transferred data equals the accumulated quantity of transferred data. When the temporary accumulated quantity of transferred data equals the accumulated quantity of transferred data, the operation state for this sampling time unit is categorized to be at a first operation state.

The first power mode can be an off mode and the second power mode can be an on mode, and the power mode of the electronic device is in the second power mode at the beginning. The first operation state can be an idle state and the second operation state can be an active state, but is not limited thereto. A user can decide the above-mentioned sampling time span as, such as 10 minutes, but it is not limited thereto. The length of each sampling time unit can also be determined by the user, such as 5 seconds, but is not limited thereto. When the first operation state is an idle state and the first power mode is an off mode, the above-mentioned predetermined value can be set to be between 0.8 and 1, but is not limited thereto.

Second Power Management Device

A power management device of the present invention includes a setup unit, a state determination unit, a calculation unit, and a decision unit. The setup unit sets up a sampling time span including a plurality of sampling time units. The state determination unit determines the operation state of the electronic device at each sampling time unit according to operation of the electronic device at each sampling time unit. The number of sampling time units, in which the electronic device is at the first operation state, in the sampling time span is calculated by the calculation unit. A decision unit operates the electronic device in either the first or the second power mode according to the number. When the number is larger than a predetermined number, the electronic device is switched to the first power mode; when the number is smaller than the predetermined number, the electronic device is switched to the second power mode.

The above-mentioned state determination unit further has a first calculation unit, a second calculation unit, and a check unit. The first calculation unit calculates an accumulated quantity of the transferred data at the beginning of one sampling time unit. The second calculation unit calculates a temporary accumulated quantity of the transferred data at the end of the sampling time unit. The check unit checks whether the temporary accumulated quantity of transferred data equals the accumulated quantity of transferred data. When the temporary accumulated quantity of transferred data equals to the accumulated quantity of transferred data, the operation state for this sampling time unit is categorized to be at a first operation state.

The first power mode can be an off mode and the second power mode can be an on mode when the power mode of the electronic device is in the second power mode at the beginning. The first operation state can be an idle state and the second operation state can be an active state, but is not limited thereto. A user can decide the above-mentioned sampling time span as, such as 10 minutes, but it is not limited thereto. The length of sampling time unit can be determined by the user, such as 5 seconds, but not limited thereto. When the first operation state is an idle state and the first power mode is an off mode, the above-mentioned predetermined value can be set to be between 0.8 and 1, but is not limited thereto.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention.

DETAILED DESCRIPTION

A method and an apparatus for power management of an electronic device are provided. The electronic device has a first and a second power mode, and may be in a first or a second operation state.

Method for Power Management of the First Embodiment

Figure 1:
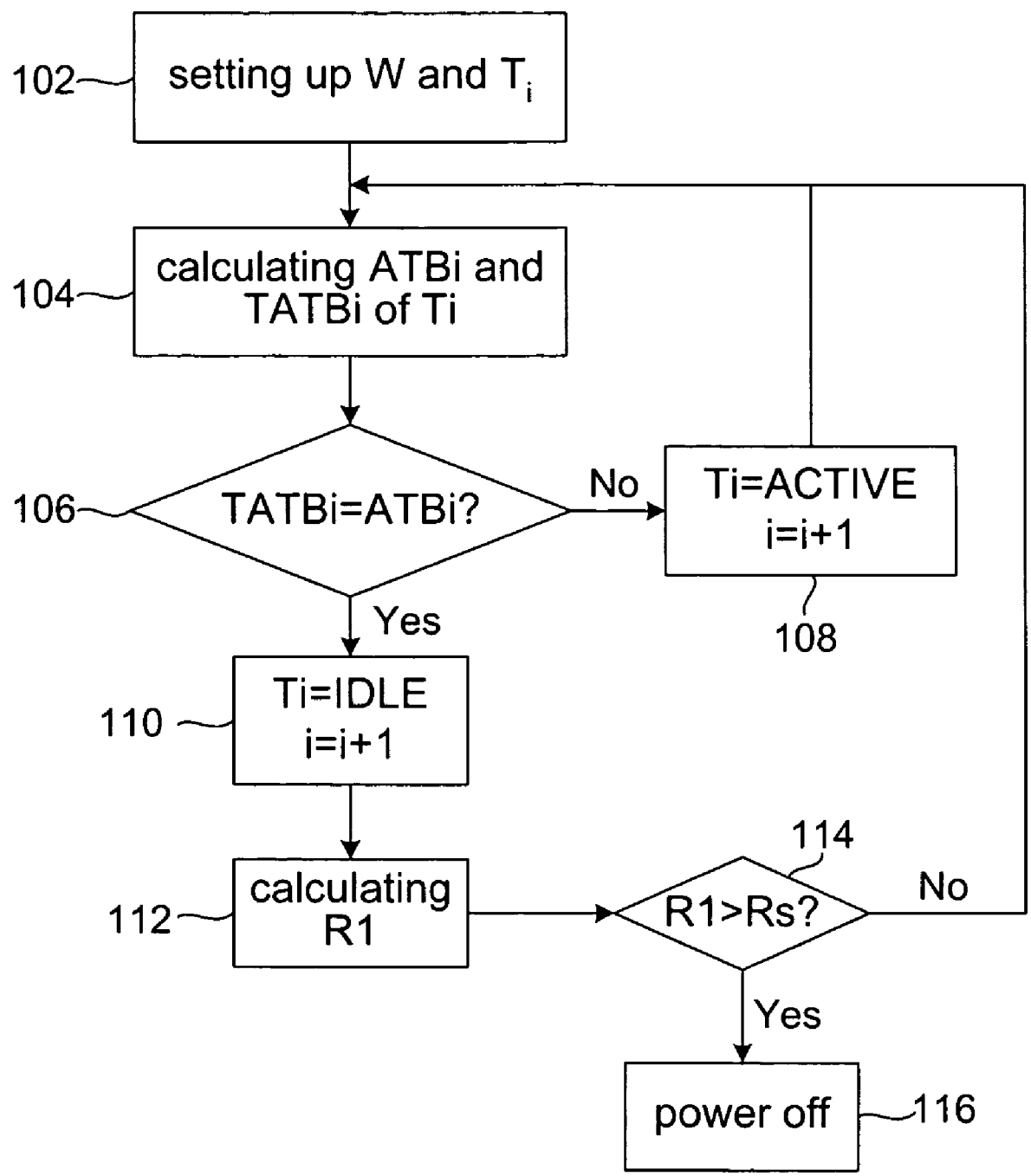
FIG. 1 is a flow diagram of a first embodiment according to the method of the present invention.
Figure 3:
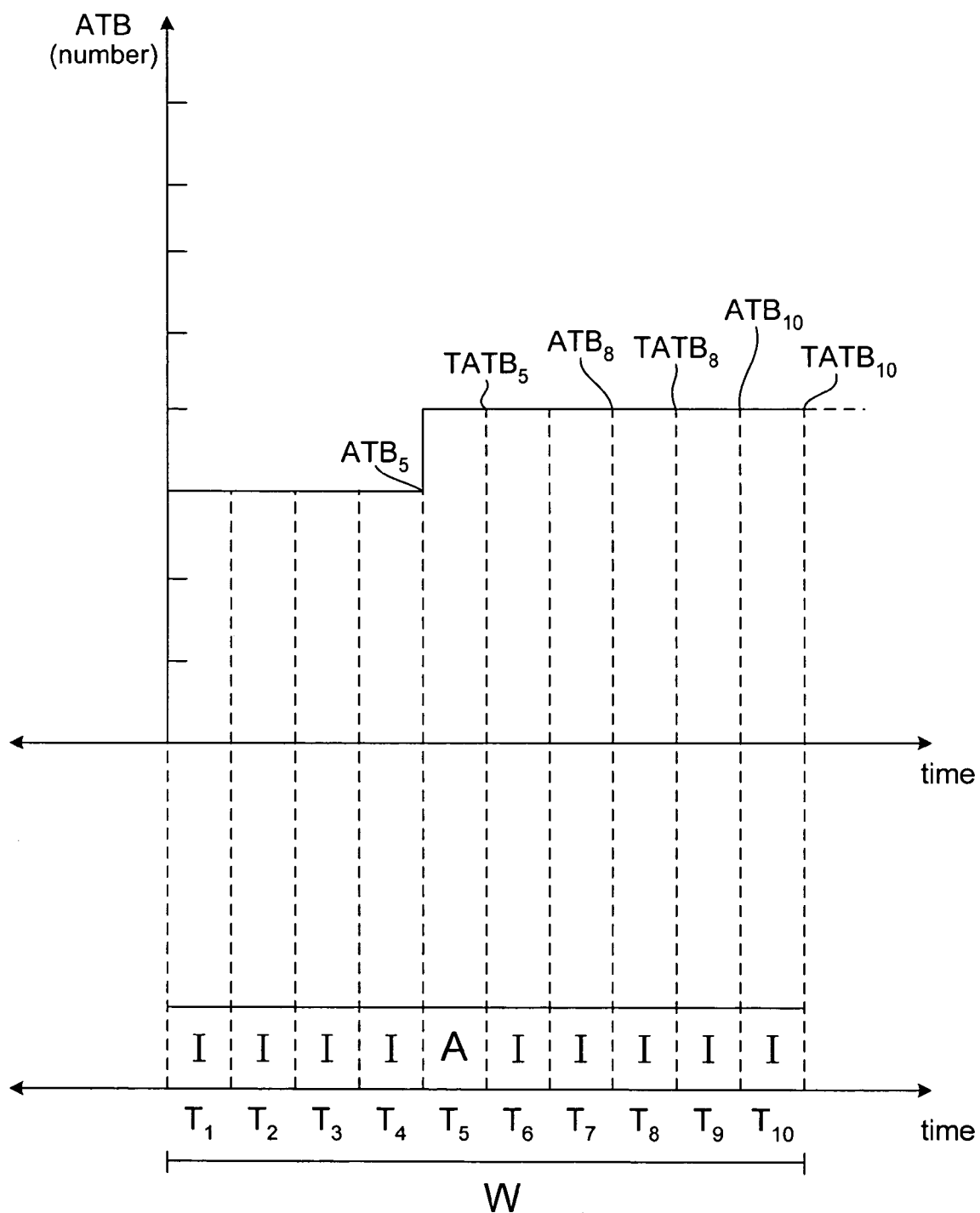
FIG. 3 is a schematic diagram of deciding the operation state according to the method of the embodiment of the present invention.

FIG. 1 and FIG. 3 explain the method for power management of the first embodiment of the present invention. In this embodiment, the first power mode is an off mode and the second power mode is an on mode, and the electronic device is in the second power mode at the beginning. In addition, the first operation state is an idle state and the second operation state is an active state.

In step 102, a sampling time span W including a plurality of sampling time units $T_i$ is set according to a use's preference, such as 10 minutes. The length of the sampling time unit $T_i$ can also be determined by the user, here the length of Ti is 1 minute for this embodiment. As shown in FIG. 3, the sampling time span W includes ten sampling time units $T_1 \sim T_{10}$ in the first embodiment.

Next, the operation state of each sampling time unit Ti is decided. In step 104, an accumulated quantity of transferred data $ATB_i$ is calculated at the beginning of one sampling time unit $T_i$. A temporary accumulated quantity of transferred data $TATB_i$ is calculated at the end of the sampling time unit. As shown in FIG. 3, $ATB_5$ is 3 at $T_5$ and $TATB_5$ is 4 at $T_5$. However, $ATB_{10}$ is 4 at $T_{10}$ and $TATB_{10}$ is 4 at $T_{10}$. Checking whether the temporary accumulated quantity of transferred data $TATB_i$ equals the accumulated quantity of transferred data $ATB_i$ is subsequently performed in step 106. The second operation state as being the operation state of the electronic device during the sampling time unit $T_i$ is decided in step 108 when the temporary accumulated quantity of transferred data $TATB_i$ does not equal the accumulated quantity of transferred data $ATB_i$. For example, as $ATB_5 \neq TATB_5$. $T_5$ is in second operation state, which is an active state in the present invention. In step 108, i is set as i+1 and step 104 is repeated to decide the operation state of the next sampling time unit $T_i$.

In step 110, the first operation state as being the operation state of the electronic device during the sampling unit $T_i$ is decided when tile temporary accumulated quantity of transferred data $TATB_i$ equals the accumulated quantity of transferred data $ATB_i$. For example, as $ATB_{10}=TATB_{10}$, $T_{10}$ is in the second operation state, which is an idle state in the present invention. In step 110 i is set as i+1 to process the next step. A ratio $R_1$ of a time sum when the electronic device is in the first operation state of the sampling time unit over the sampling time span W is calculated (step 112). For example, $R_1$ is calculated as $T_{10}$ is in the first operation state. The electronic device is in the first operation state in 9 out of 10 sampling time units, so the ratio $R_1$ equals 0.9.

In step 114, whether the ratio $R_1$ is larger than the predetermined value $R_s$ is decided to determine the power mode of the electronic device. The predetermined value $R_s$ is 0.85 when the first operation state is an idle state and the first power mode is an off mode as in the present embodiment. If the ratio $R_1$ is larger than the predetermined value $R_s$, the electronic device is in the first power mode (step 116). The first power mode of the present embodiment is an off mode. For example, the power of the electronic device will be in an off mode achieving the power-saving effect when $R_1$ (=0.9) is larger than $R_s$ (=0.85) at the end of $T_{10}$.

A user can manually start the power of the electronic device again after the power of the present embodiment is turned off, or the electronic device can be started automatically and remain in the second power mode before transferring data again.

The electronic device will be in a second power mode and step 104 will be repeated if the ratio $R_1$ is smaller than the predetermined value $R_s$. The second power mode of the present embodiment is an on mode. For example, because $TATB_8$ equals $ATB_8$ and the electronic device is in the first operation state at $T_8$, $R_1$ needs to be calculated. The electronic device is in the first operation state in 7 out of 10 sampling time units, so that ratio $R_1$ equals 0.7. Since $R_1$ (=0.7) is smaller than the predetermined value $R_s$ (=0.85), the electronic device will remain in an on mode and step 104 will be repeated.

Method for Power Management of the Second Embodiment

Figure 2:
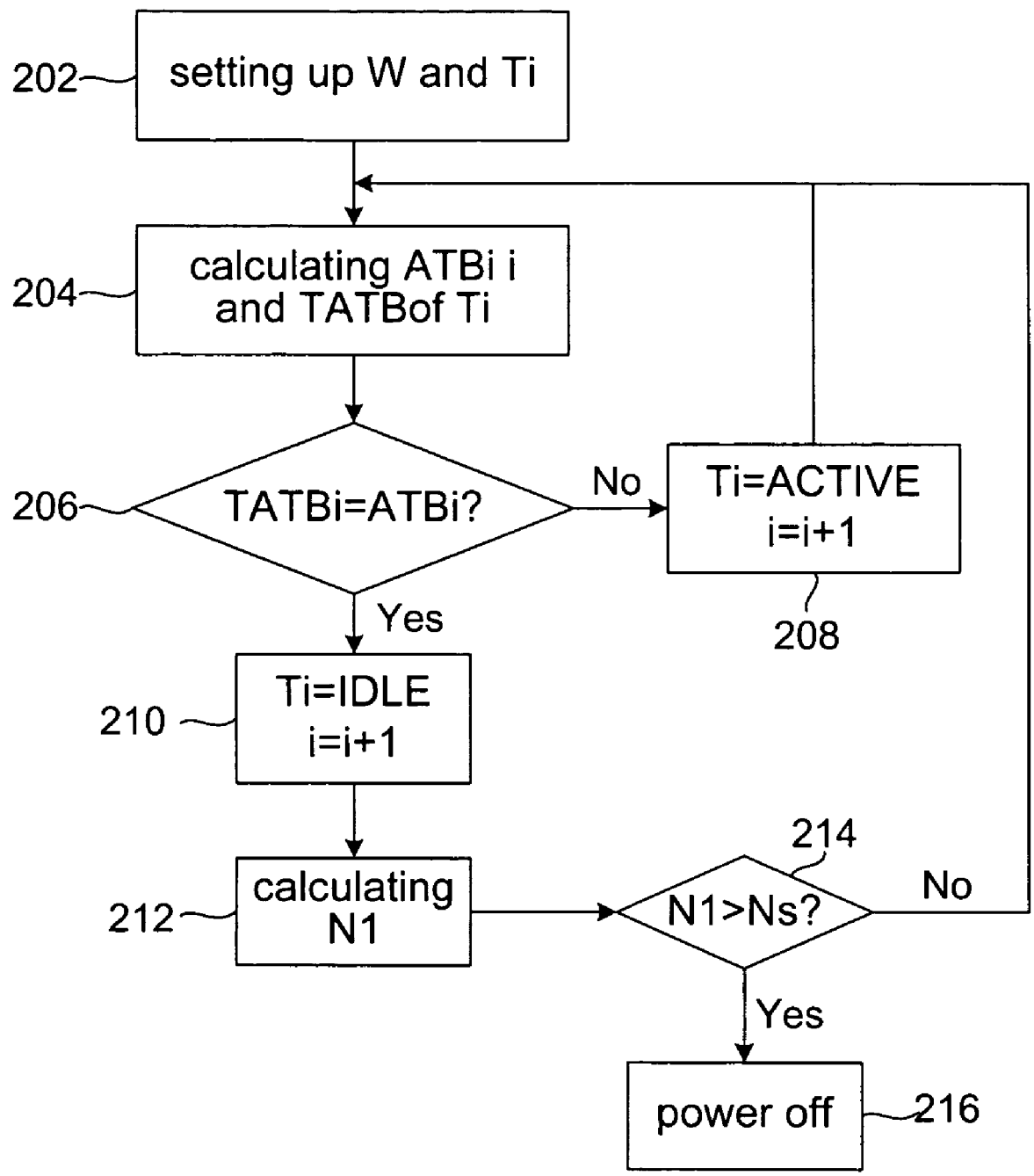
FIG. 2 is a flow diagram of a second embodiment according to the method of the present invention.

FIG. 2 and FIG. 3 explain the method for power management of the second embodiment of the present invention. In this embodiment, the first power mode is an off mode and the second power mode is an on mode, and also the power mode of the electronic device is in the second power mode at the beginning. In addition, the first operation state is an idle state and the second operation state is an active state. Steps 202~210 are similar to steps 102~110 of the method for power management of the first embodiment.

In step the 212 of the second embodiment. As the electronic device is in the first operation state, the number $N_1$ of the sampling time unit $T_i$ when the electronic devices in the first operation state in a sampling span W is calculated. For example, $N_1$ is calculated as $T_{10}$ is in the first operation state. At 9 of the sampling time units, the electronic device is in the First operation state, so $N_1$ equals 9.

In step 214, whether the number $N_1$ is larger than the predetermined number $N_s$ is decided to determine the power mode of the electronic device. The predetermined value $N_s$ can be 8 when the first operation state is an idle state and the first power mode is an off mode as in the present embodiment. In step 216, if the number $N_1$ is larger than the predetermined number N, the electronic device is in the first power mode. The first power mode of the present embodiment is an off mode. For example, the power of the electronic device will be in an off mode achieving the power-saving effect when $N_1$ (=9) is larger than $N_s$ (=8) at the end of $T_{10}$.

A user can manually start the power of the electronic device again after the power of the present embodiment is turned off, or the electronic device can be started automatically and remain in the second power mode before transferring data again.

The electronic device will be in a second power mode and step 204 will be repeated if the number $N_1$ is smaller than the predetermined number $N_s$. The second power mode of the present embodiment is an on mode. For example, because $TATB_8$ equals $ATB_8$ and the electronic device is in the first operation at $T_8$, $N_1$ needs to be calculated. The electronic device is in the first operation state in 7 out of 10 sampling time units, so $N_1$ equals 7. Since $N_1$ (=7) is smaller than the predetermined value $N_s$ (=8), the electronic device will remains in an on mode and step 204 will be repeated.

First Embodiment of the Apparatus for Power Management

Figure 4:
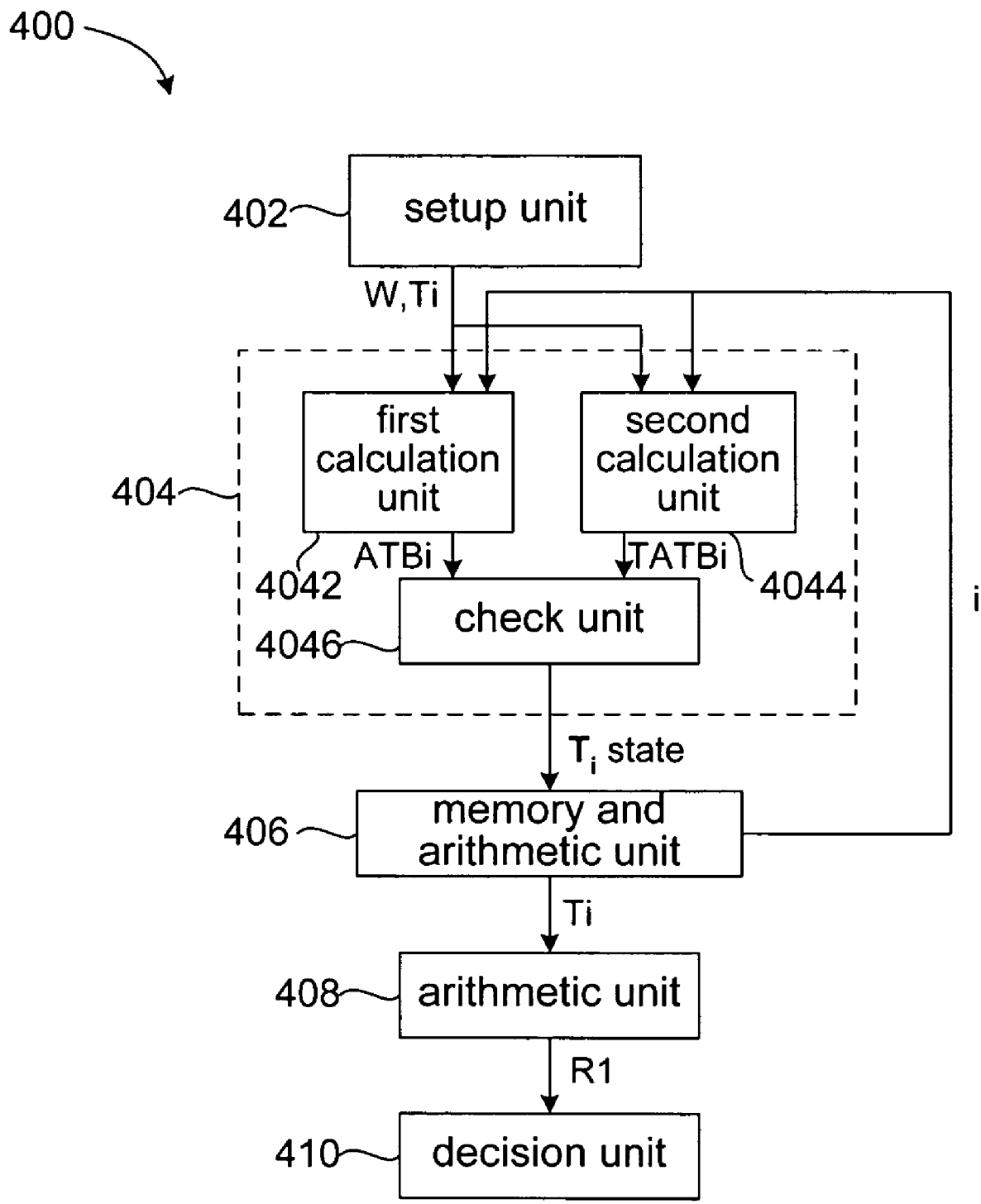
FIG. 4 is a schematic diagram of the first embodiment according to the apparatus of the present invention.

A method and an apparatus for power management of an electronic device are provided. The electronic device has a first and a second power mode, and may be in a first or a second operation state. FIG. 4 explains the first embodiment 400 of the apparatus for power management of the present invention. The device for power management of the embodiment includes a setup unit 402, a state determination unit 404, a memory and calculation unit 406, an calculation unit 408 and a decision unit 410. Setup unit 402 sets up a sampling time span including a plurality of sampling time units. Data of the sampling time span and the sampling time units are transferred to state determination unit 404. The state determination unit 404 determines the operation state of the electronic device at each time sampling unit according to the operation of the electronic device at each sampling time unit. Data about the operation of the electronic device at each sampling time unit are transferred to a memory and calculation unit 406. The memory and calculation unit 406 stores the data of the operation state at each sampling time unit, and sets i as i+1 to process the next sampling time unit. The calculation unit 408 calculates a ratio of a time sum under the first operation state over the sampling time span. The ratio is transferred to the decision unit 410. The decision unit 410 decides to operate the electronic device in either the first or the second power mode according to the ratio. When the ratio is larger than a predetermined value, the electronic device is switched to the first power mode; when the ratio is smaller than the predetermined value, the electronic device is switched to the second power mode.

The state determination unit 404 further includes a first calculation unit 4042, a second calculation unit 4044, and a check unit 4046. The first calculation unit 4042 calculates an accumulated quantity of transferred data at the beginning of one sampling time unit. The second calculation unit calculates a temporary accumulated quantity of transferred data at the end of the sampling time unit. The check unit checks whether the temporary accumulated quantity of transferred data equals the accumulated quantity of transferred data. The first operation state as being the operation state of the electronic device during the sampling time unit is decided when the temporary accumulated quantity of transferred data equals the accumulated quantity of transferred data.

The first power mode can be an off mode and the second power mode can be an on mode. In this case, the electronic device is in the second power mode at the beginning as in embodiment 400, but is not limited thereto. The first operation state can be an idle state and the second operation state can be an active state, but are not limited thereto. A user can decide the above-mentioned sampling time span as, for example, 10 minutes, but it is not limited thereto. The length of each sampling time unit is arbitrary, such as 5 seconds. When the first operation state is an idle state and the first power mode is an off mode, the above-mentioned predetermined value is neither smaller than 0.8 nor larger than 1.

Second Embodiment of the Apparatus for Power Management

Figure 5:
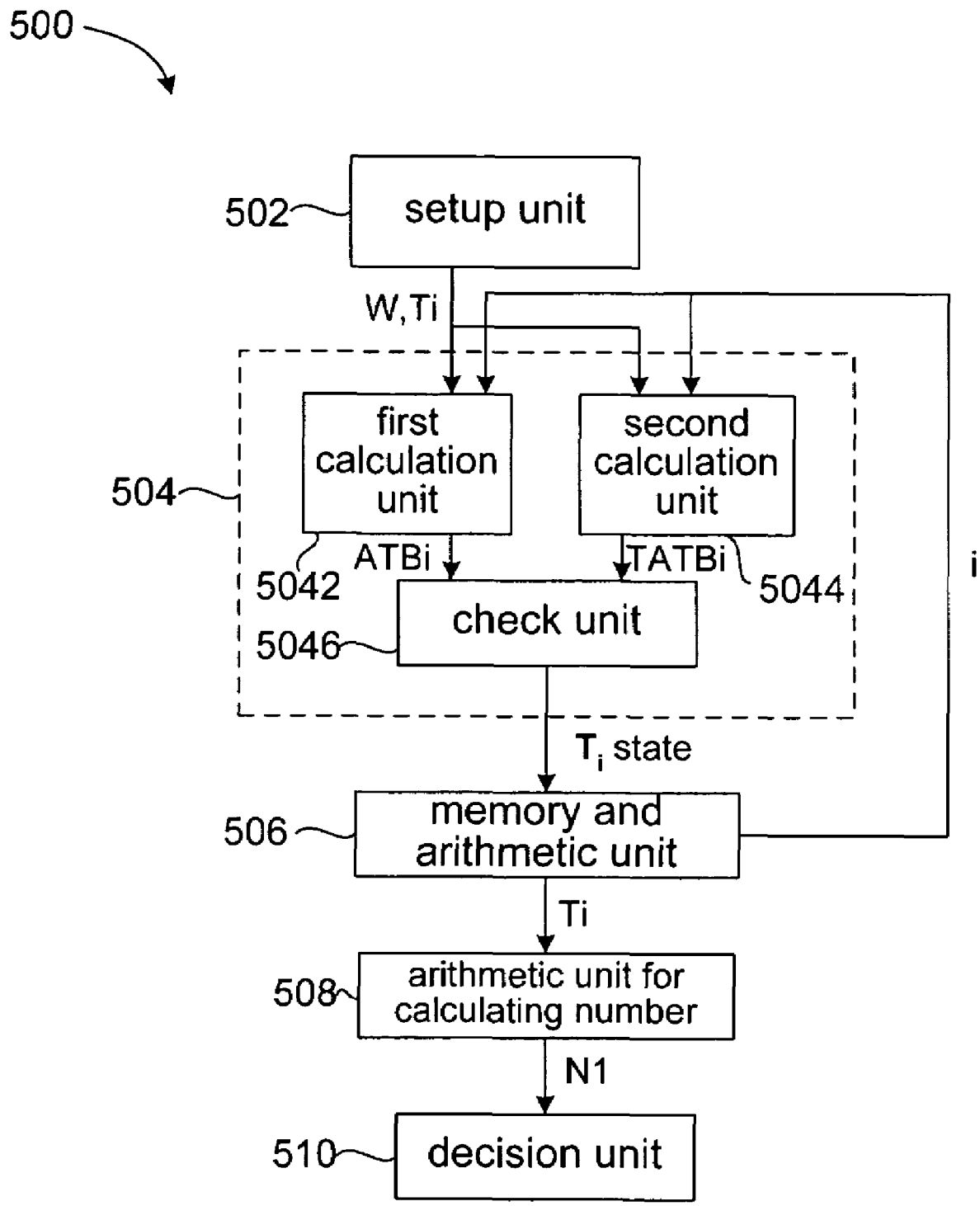
FIG. 5 is a schematic diagram of the second embodiment according to apparatus of the present invention.

FIG. 5 explains the second embodiment 500 of the apparatus for power management of the present invention. Elements 502 and 5042~5046 of the apparatus for power management of the second embodiment 500 correspond to elements 402 and 4042~4046 of the apparatus for power management of the first embodiment 400. An calculation unit 508 of the present embodiment 500 calculates number of the first operation state during the sampling time span. A decision unit 510 decides to operate the electronic device in either the first or the second power mode according to the number. When the number is larger than a predetermined value, the electronic device is switched to the first power mode; when the number is smaller than the predetermined value, the electronic device is switched to the second power mode.

The first power mode can be an off mode and the second power mode can be an on mode. In this case, the electronic device is in the second power mode at the beginning as in embodiment 500, but is not limited thereto. The first operation state can be an idle state and the second operation state can be an active state, but are not limited thereto. A user can decide the above-mentioned sampling time span as, for example, 10 minutes, but it is not limited thereto. The length of each sampling time unit is arbitrary, such as 5 seconds.

In addition to the first power mode and the second power mode, the electronic apparatus can also be switched to a third power mode. The third power mode is a power-saving mode and consumes power by an amount between the first and the second power modes. The electronic device is switched between the second and the third power modes when connected to an external power source. The electronic device is switched between the first, the second, and/or the third power modes when it is powered by a battery.

While this invention has been described with reference to the illustrative embodiments, these descriptions should not be construed in a limiting sense. For example, the time units and sampling time spans can be different, and the power mode is not limited to two or three types. Various modifications of the illustrative embodiment, as well as other embodiments of the invention, will be apparent upon reference to these descriptions. It is therefore contemplated that the appended claims will cover any such modifications or embodiments as falling within the true scope of the invention and its legal equivalents.

The invention claimed is:

1. A power management method of an electronic device that can be operated under at least a first operation state and a second operation state, said electronic device having a first power mode and a second power mode, said method comprising steps of:
    setting up a sampling time span that includes a plurality of sampling time units;
    determining the operation state of said electronic device at each said sampling time unit, wherein determining the operation state of said electronic device at said sampling time unit comprises steps of:
        calculating an accumulated quantity of transferred data at the beginning of said sampling time unit;
        calculating a temporary accumulated quantity of transferred data at the end of said sampling time unit;
        comparing said temporary accumulated quantity of transferred data with the accumulated quantity of transferred data; and
        categorizing the operation state of said electronic device during said sampling time unit as being said first operation state when said temporary accumulated quantity of transferred data substantially equals said accumulated quantity of transferred data;
    calculating a first ratio of said sampling time units in which said electronic device is operated under said first operation state; and
    operating said electronic device according to said first ratio, wherein said electronic device is switched to said first power mode when said first ratio is larger than predetermined value, wherein said electronic device is switched to said second power mode when said first ratio is smaller than the predetermined value.

2. The power management method according to claim 1, wherein said first operation state is idle state and said first power mode is off mode, and said predetermined value is between 0.8 and 1.

3. The power management method according to claim 1, wherein said first operation state is idle state and said first power mode is off mode, and said predetennined value is between 0.85 and 0.95.

4. A power management method of an electronic device that can be operated under at least a first operation state and a second operation state, said electronic device having a first power mode and a second power mode, said method comprising steps of:

setting up a sampling time span that includes a plurality of sampling time units;

determining the operation state of said electronic device at each said sampling time unit. wherein determining the operation state of said electronic device at said sampling time unit comprises steps of:

calculating an accumulated quantity of transferred data at the beginning of said sampling time unit;

calculating a temporary accumulated quantity of transferred data at the end of said sampling time unit;

comparing said temporary accumulated quantity of transferred data with the accumulated quantity of transferred data; and categorizing the operation state of said electronic device during said sampling time unit as being said first operation state when said temporary accumulated quantity of transferred data substantially equals said accumulated quantity of transferred data;

calculating a first number of said sampling time units in which said electronic device is operated under said first operation state; and operating said electronic device according to said first number, wherein said electronic device is switched to said first power mode when said first number is larger than predetermined value, and wherein said electronic device is switched to said second power mode when said first number is smaller than the predetermined value.

5. A power management system of an electronic device that can be operated under at least a first operation state and a second operation state, said electronic device having a first power mode and a second power mode, said power management system comprising:

a setup unit for setting up a sampling time span including a plurality of sampling time units;

a state determination unit for determining the operation state of said electronic device at each said sampling time unit, the state determination unit comprising:

a first calculation unit for calculating an accumulated quantity of transferred data at the beginning of said sampling time unit;

a second calculation unit for calculating a temporary accumulated quantity of transferred data at the end of said sampling time unit;

a check unit for comparing said temporary accumulated quantity of transferred data with the accumulated quantity of transferred data, wherein the operation state of said electronic device during said sampling time unit is categorized to be said first operation state when said temporary accumulated quantity of transferred data substantially equals said accumulated quantity of transferred data;

an arithmetic unit for calculating a first ratio of said sampling time units in which said electronic device is operated under said first operation state; and a decision unit for operating said electronic device according to said first ratio, wherein said electronic device is switched to said first power mode when said first ratio is larger than a predetermined value, wherein said electronic device is switched to said second power mode when said first ratio is smaller than the predetermined value.

6. The power management system according to claim 5, wherein said first operation state is idle state and said first power mode is off mode, and said predetermined value is between 08 and 1.

7. The power management system according to claim 5, wherein said first operation state is idle state and said first power mode is off mode, and said predetermined value is between 0.85 and 0.95.

8. A power management system of an electronic device that can be operated under at least a first operation state and a second operation state, said electronic device having a first power mode and a second power mode, said power management system comprising:

a setup unit for setting up a sampling time span including a plurality of sampling time units;

a state determination unit for determining the operation state of said electronic device at each said sampling time unit, the state determination unit comprising:

a first calculation unit for calculating an accumulated quantity of transferred data at the beginning of said sampling time unit;

a second calculation unit for calculating a temporary accumulated quantity of transferred data at the end of said sampling time unit;

a check unit for comparing said temporary accumulated quantity of transferred data with the accumulated quantity of transferred data, wherein the operation state of said electronic device during said sampling time unit is categorized to be said first operation state when said temporary accumulated quantity of transferred data substantially equals said accumulated quantity of transferred data;

an arithmetic unit for calculating a first number of said sampling time units in which said electronic device is operated under said first operation state; and a decision unit for operating said electronic device according to said first number, wherein said electronic device is switched to said first power mode when said first number is larger than a predetermined value, wherein said electronic device is switched to said second power mode when said first number is smaller than the predetermined value.

\* \* \* \* \*